United States Patent [19]
Kasten

[11] 3,844,604
[45] Oct. 29, 1974

[54] FORAGE WAGON WITH HINGED ROOF

[76] Inventor: John E. Kasten, 136 Concord Ln., West Bend, Wis. 53095

[22] Filed: Aug. 14, 1972

[21] Appl. No.: 280,235

Related U.S. Application Data

[63] Continuation-in-part of Ser. No. 36,772, May 13, 1970, abandoned, which is a continuation-in-part of Ser. No. 847,909, Aug. 6, 1969, Pat. No. 3,572,811.

[52] U.S. Cl. ............................. 296/26, 296/137 B
[51] Int. Cl. ........................................... B62d 33/08
[58] Field of Search ............ 296/137 B, 23 R, 23 C, 296/26

[56] References Cited
UNITED STATES PATENTS

| | | | |
|---|---|---|---|
| 2,963,313 | 12/1960 | Bennett | 296/26 |
| 3,376,059 | 4/1968 | Corl | 296/26 |
| 3,411,819 | 11/1968 | Tyree | 296/23 R |
| 3,694,024 | 9/1972 | Linville | 296/26 |

Primary Examiner—Philip Goodman
Attorney, Agent, or Firm—Michael, Best & Friedrich

[57] ABSTRACT

Disclosed herein is a roof connected to the walls of a box for swinging roof movement about a horizontal axis, together with an integrated mechanism for strengthening the upper margins of the box side walls against laterally outward deflection, for raising the roof to a position with the roof top panel in inclined disposition so as to increase the open area at one end of the box, and for releasably preventing swinging movement of the roof.

One embodiment of the invention involves the use of guides on the sides of the box, which guides form ways for vertically extending posts or brace members which are connected at their tops by tie rods and which include means engageable with the roof for swinging the roof about its axis in response to vertical post movement. Also disclosed are releaseable means for preventing vertical movement between the posts and the guides.

Another embodiment of the invention utilizes screw jacks to pivot the roof and to hold the roof in selected position. In still another embodiment, releasable means are additionally provided to hold the roof in selected position so as to relieve loading on the screw jacks.

11 Claims, 9 Drawing Figures

PATENTED OCT 29 1974 3,844,604
SHEET 1 OF 2
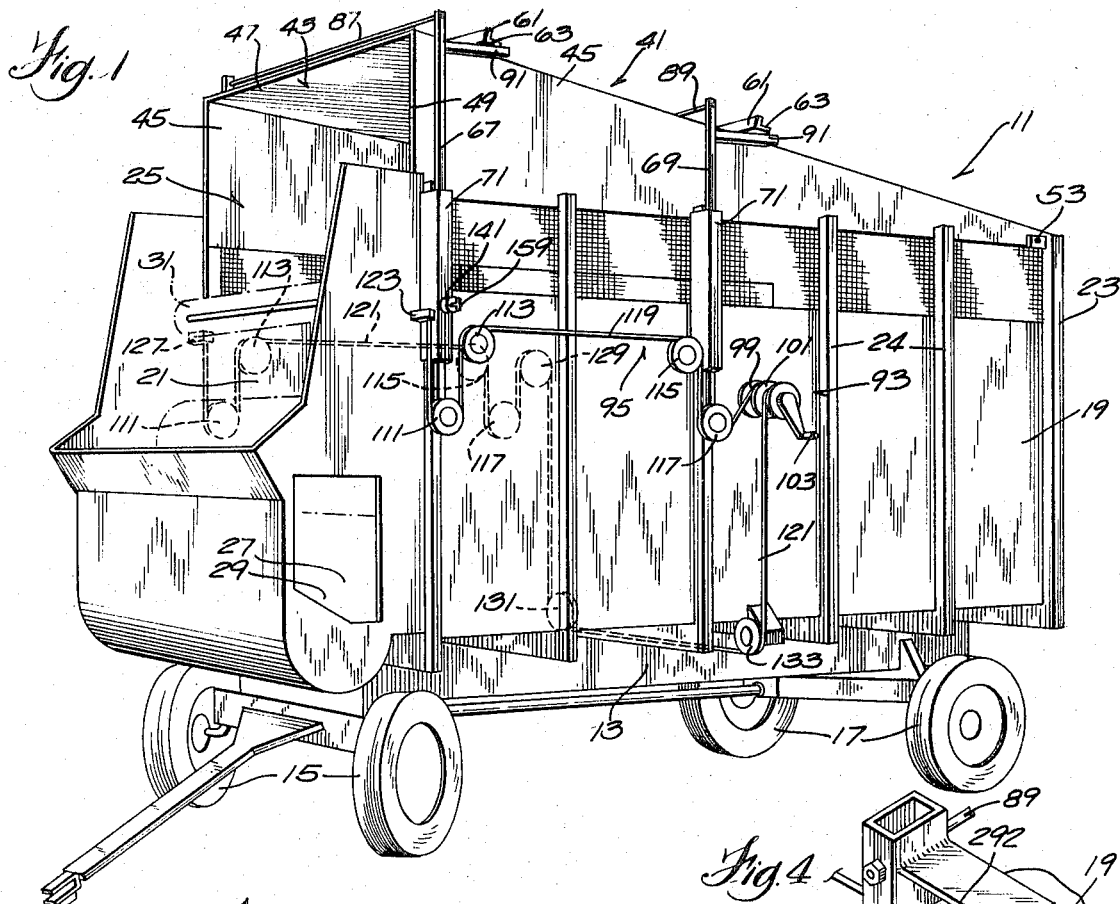
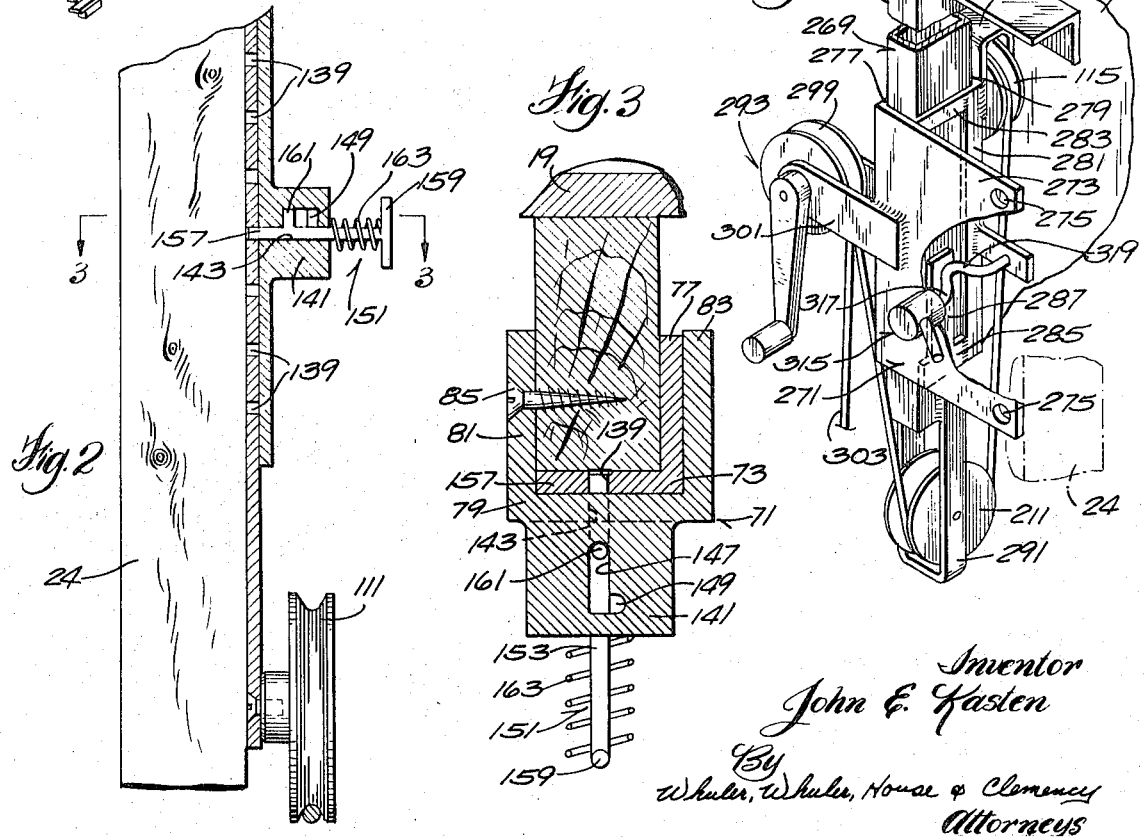
Inventor
John E. Kasten
By Wheeler, Wheeler, House & Clemency
Attorneys

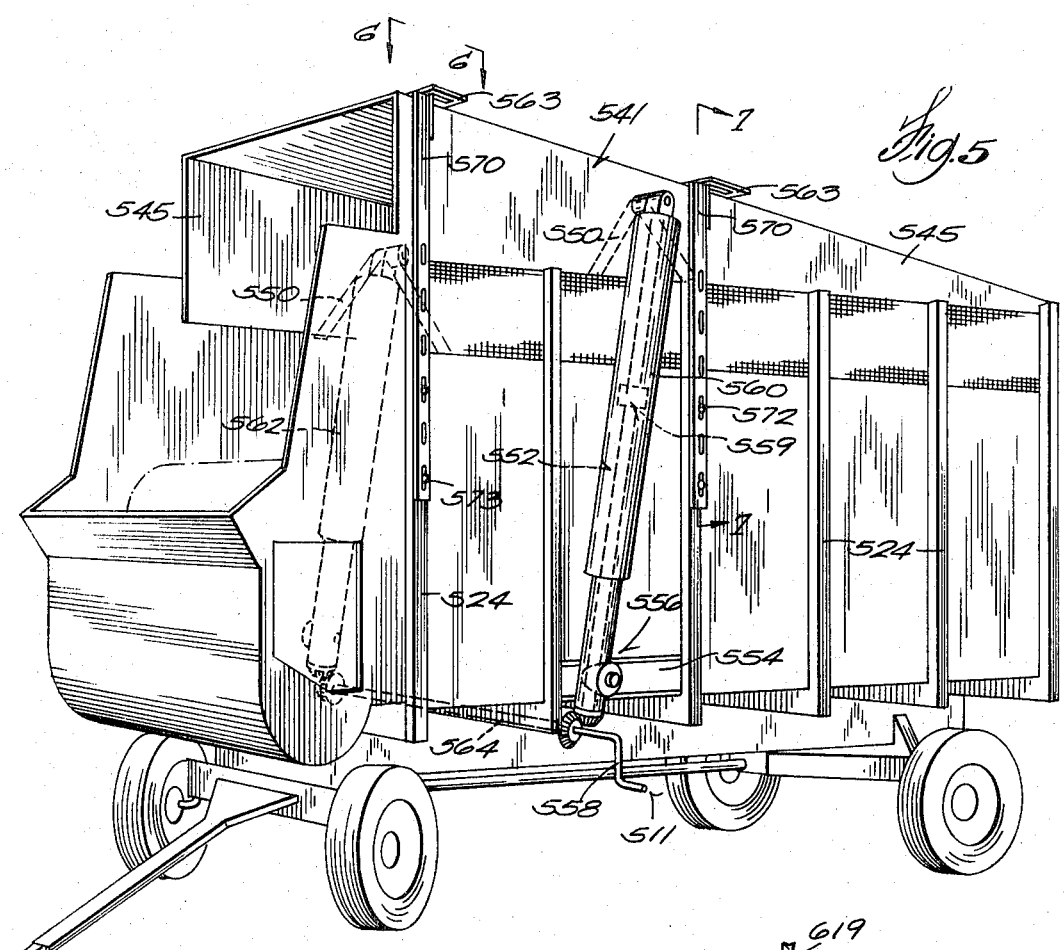
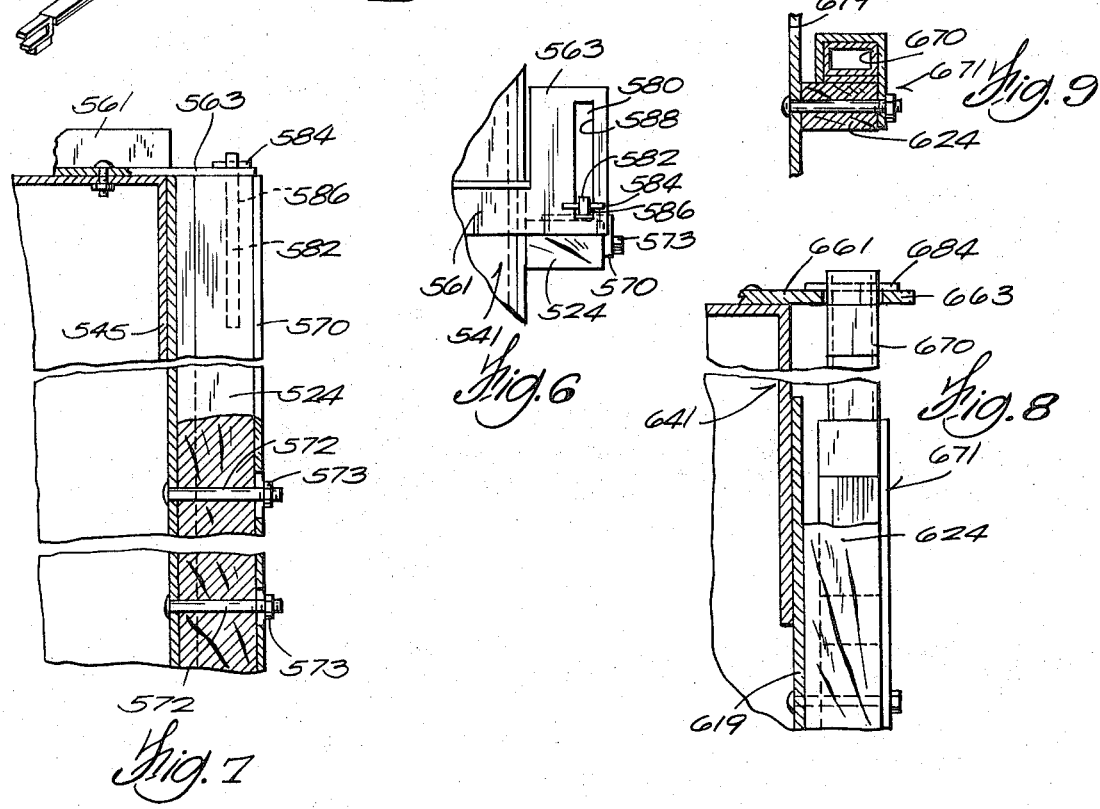

FORAGE WAGON WITH HINGED ROOF

REFERENCE TO RELATED APPLICATIONS

This application is a continuation-in-part of my earlier application Ser. No. 36,772, filed May 13, 1970, now abandoned, which, in turn, is a continuation-in-part of my earlier application Ser. No. 847,909, filed Aug. 6, 1969 now U.S. Pat. No. 3,572,811.

BACKGROUND OF THE INVENTION

The above mentioned application Ser. No. 847,909 discloses a forage wagon having a tiltably or swingably supported roof and means for releasably fixing the roof to the side walls to maintain the roof in upwardly and forwardly inclined disposition to increase the open area at one end of the wagon. Although the construction disclosed in application Ser. No. 847,909 is very desirable and has been commercially successful, it is additionally desirable to provide an arrangement for assisting the farmer in changing the disposition of the roof. It is also desirable that mechanism be provided for positively contributing to preventing outwardly bulging of the sides of the wagon under loading.

SUMMARY OF THE INVENTION

The invention provides a roof which is adapted to be hinged to a supporting structure, such as a box, and mechanism for raising and lowering the roof (i.e., for positioning the roof) about its hinge relative to the supporting structure or box and for holding the roof in selected position. When incorporated in a forage wagon, the invention provides a means for raising and lowering the hinged roof of a forage wagon so as to increase the area open for filling of the wagon while alternately affording a low profile to permit entry and exit through barn doors and the like.

The invention also provides means for reinforcing the upper and forward margins of the side wagon walls independently of, or in cooperation with the roof, and independently of, or in cooperation with the roof positioning means, to prevent laterally outwardly bending or bulging of these walls under heavy loading.

In one embodiment, the roof raising arrangement and the side wall reinforcing arrangement are integrated into a dual purpose mechanism. In addition, the invention further provides for, in cooperation in the dual purpose mechanism, means for releasably locating the roof in one of several positions.

More specifically, one embodiment of the invention provides an arrangement including one or more guides on each side of a wagon, respective reinforcing posts or brace members vertically movable in the guides and connected at their upper ends to a tie rod which is in tension when the wagon is heavily loaded and which is independent of the roof. In addition, the roof includes transverse members or shoulders extending at the sides thereof and posts or bracing members including horizontally extending surfaces engageable with the transverse members or shoulders so as to support the roof about its hinge and so as to afford relative movement between the posts or brace members and the transverse members or shoulders during tilting movement of the roof.

Still further, the invention provides means connected to the posts on each side of the wagon for simultaneously affording and controlling vertical movement of the bracing members or posts to raise and lower the roof about its hinge. In one disclosed embodiment, such means includes a winch and a pulley system which is operatively connected to the posts on both sides of the wagon to afford simultaneous roof tilting vertical post movement.

In addition, the posts and guides are provided with releasable means for securing the posts to the guides to prevent vertical movement therebetween. Such means can include a series of vertically spaced holes in at least one of the posts and a key supported by the associated guide for releasable engagement with any one of the holes in the associated post to variably determine the height of the post relative to the guide.

In another or preferred embodiment of the invention, the roof positioning mechanism comprises a pair of generally vertically arranged jack screws which are pivotally connected at their upper ends to the roof, and which are pivotally connected at their lower ends, to the box or supporting structure. Also provided are means operable to prevent bulging of the upper and forward margins of the box. Either of the roof positioning means or the bulging prevention means can be employed to hold the roof in selected position.

More particularly, the bulging prevention means comprises vertically extending bracing members which are movable relative to vertically extending reinforcing guide members on the box-like structure and which are connected to transverse roof members so as to place such transverse members under tension and, if desired, to hold the roof in selected position. Still more specifically, the transverse roof members include laterally extending and opposing end parts which are slotted to respectively receive the upper portions of the vertical brace members so as to afford relative movement therebetween in the direction perpendicular to the pivot axis of the roof, to transmit tension loading to the transverse roof members while minimizing transmission of any bending load, and to afford common vertical movement of the brace members with the transverse roof members and the connected roof.

It is noted that the transverse roof members preferably extend completely across the roof and, at each end, cooperate with the brace members to place the transverse members under tension so as thereby to assist in preventing bulging of the upper and forward margins of the box-like structure.

One of the principal objects of the invention is the provision of a mechanism for pivotally raising and lowering a roof relative to a supporting box or other structure and for holding or maintaining the roof in selected position.

Another of the principal objects of the invention is the provision of a mechanism strengthening the structure against transverse bulging, which mechanism can be independent of or integrated with the roof positioning means or the means for holding the roof in selected position. Such strengthening means employs a transverse member which is substantially solely placed in tension to prevent side wall bulging.

Another of the principal objects of the invention is the provision of a new and improved wagon having a tiltable roof, such as a forage wagon.

Another object of the invention is the provision of an effective and economical means for raising and lowering the hinged roof of a wagon and for simultaneously strengthening the upper margins of the walls of the wagon.

Still another object of the invention is the provision of a wagon which will provide one or more of the features enumerated above and which can be economically constructed and will provide a long and useful life.

Other objects and advantages of the invention will become known by reference to the following description and accompanying drawings.

DRAWINGS

FIG. 1 is a perspective view of a first embodiment of a wagon embodying various of the features of the invention.

FIG. 2 is a fragmentary vertical view, partially in section, of a portion of the apparatus shown in FIG. 1.

FIG. 3 is an enlarged fragmentary sectional view taken along line 3—3 of FIG. 2.

FIG. 4 is a fragmentary perspective view, partially broken away and in section, showing an alternative construction of various of the components shown in FIG. 1.

FIG. 5 is a perspective view of a second embodiment of a forage wagon embodying various of the features of the invention.

FIG. 6 is a fragmentary view taken generally along line 6—6 shown in FIG. 5.

FIG. 7 is a fragmentary view taken generally along line 7—7 shown in FIG. 5.

FIG. 8 is a fragmentary view of still another modification or embodiment of the invention.

FIG. 9 is a sectional view taken transversely through FIG. 8.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

General description

Shown in the drawings is a farm wagon which is generally designated 11 and which is specifically disclosed as a forage wagon. The wagon, as disclosed, conventionally includes a frame 13 which is supported by front and rear wheels 15 and 17 for travel over the ground. Extending in upstanding relation from the frame 13 (FIG. 2) are spaced side walls 19 and 21 and an end or rear wall 23 which is connected to the rearward edge of the side walls 19 and 21 to provide a box-like structure which is, at least partially, open, as indicated at 25, at the other or frame end remote from the rear wall 23. The side walls are reinforced by upstanding beams or members 24. While other constructions can be employed, in the disclosed construction, the side and end walls are fabricated of wood and the reinforcing members 24 are 2× 4 studs.

The forage wagon 11 can also conventionally include a generally horizontal apron conveyor 27, such as disclosed in U.S. Pat. No. 3,223,264, which apron conveyor extends horizontally between the side walls 19 and 21. Located at the front of the apron conveyor 27 is a transverse auger 29 which is arranged to convey forage from the conveyor for lateral discharge at the end of the auger, also as generally shown in U.S. Pat. No. 3,275,176.

Arranged above the auger 29 can be several beaters 31. Various arrangements, such as disclosed, for instance, in my U.S. Pat. No. 3,275,176 can be employed for driving and controlling the beaters 31, the apron conveyor 27, and the auger 29. Notwithstanding the provisions of the auger 29 and the beaters 31, it will be noted that the front of the wagon 11 is still substantially open, particularly at the top at 25, and that the upper front portions and the upper edges of the side walls are, in large measure, transversely unsupported.

In accordance with the invention, the wagon 11 includes a roof or a cover structure 41, which is hinged at the rear about a horizontal axis to accommodate vertical roof swinging movement between a lowered or retracted position, an upper or fully elevated or raised position increasing the open area 25 at the front of the forage wagon and one or more intermediate positions. The hinged roof 41 serves several functions including providing a cover for the forage in the wagon to prevent loss of such forage out of the top of the wagon during transit and otherwise, while at the same time, offering an arrangement whereby the opening at the front of the wagon can be enlarged, as desired, to facilitate filling of the wagon. It is to be noted that such enlargement is provided while still permitting passage of the wagon through doors or openings having a relatively low overhead when the roof is located in its lowered position.

More particularly, the roof 41 includes a top panel 43 and two side panels 45 which respectively extend from the side edges of the top panel 43. Preferably, the inner or undersurface 47 of the top panel 43 is smooth, so as to avoid catching or snaring of the forage thereon. Desirably, the side panels 45 are each generally of right triangular shape with the hypotenuse edge top being connected to the top panel 41 and with one of the side edges 49 extending principally up and down or vertically adjacent the forward end of the wagon and with the other of the right angle edges extending principally front to back or horizontally of the wagon or vehicle.

Means are provided for swingably mounting the roof 41 to the walls of the wagon so as to provide vertical swinging of the roof about a horizontal axis between its lowered and raised positions.

While various arrangements for accomplishing the foregoing function can be employed, in the disclosed construction such means includes a pair of axially aligned bolts 53 respectively connecting the upper rear corner of the respective side walls 19 and 21 with the rearward portion of the roof 41. If desired, hinges between the top roof panel 43 and the rear wall 23 could be employed to provide for vertical swinging of the roof. Transverse strengthening of the upper roof panel 43 is provided by means in the form of one or more transverse cross members 61. While various arrangements are possible, in the disclosed construction, the transverse roof reinforcing members 61 are secured to the upper or outer surface of the top panel 43 and include ends 63 which project sufficiently outwardly from the sides of the roof to assist in providing roof support as will hereinafter be explained. It is to be noted that reinforcement of the roof top panel 43 by placement of the reinforcing cross-members 61 on the upper surface of the roof leaves the inner surface 47 smooth to avoid the possibility of catching or snaring forage on the lower surface of the top roof panel.

In accordance with the invention, means are provided for strengthening the side walls 19 and 21 of the wagon 11, and particularly the upper and forward margins thereof, against laterally outward deflection when the wagon 11 is loaded with forage, for raising or positioning the roof 41 to locate the roof top panel 47 in upwardly and forwardly inclined disposition to increase the open area at the end of the wagon 11 remote from the end wall 23, and for releasably retaining the roof 41 in the fully raised position and in one of several positions between the lowered position and the fully raised position.

While various constructions can be employed, the means which provides the three functions mentioned immediately above includes, on each side of the wagon 11, one or more reinforcing rigid members or posts which are shown in FIGS. 1 through 3 in the form of angle irons and which are mounted on the side walls for vertical movement relative thereto. Such posts can also be readily fabricated in the form of an elongated rectangular tube as shown in FIG. 4. While various reinforcing strap arrangements can be employed, in the disclosed construction, there is, on each side of the wagon, one forward reinforcing post or brace member 67 and one rearward reinforcing post or brace member 69.

Means are provided for retaining the reinforcing posts against the reinforcing beams 24 or against side walls 19 and 21 while affording vertical movement. While various arrangements can be employed, in the construction shown in FIGS. 1 through 3, each of the reinforcing posts 67 and 69 is retained against the associated side of the wagon while permitting vertical movement by nesting the angle iron posts 67 and 69 as shown in FIG. 3 against an associated upright side wall reinforcing beam 24 and by affixing a U-shaped guide or channel 71 about the nested arrangement of the associated angle iron strap and the 2 × 4 reinforcing beam 24.

Still more particularly, as shown in FIG. 3, each angle iron post includes two flanges 73 and 77 with the flange 73 being located against the outermost surface of the associated 2 × 4 reinforcing beam 24, while the other flange 77 lies against one of the front or back surfaces of the associated 2 × 4 reinforcing beam 24.

The guide 71 shown in FIG. 3 includes a web 79 and two flanges 81 and 83 and is suitably connected, as by heavy wood screws 85, to the associated reinforcing beams 24 with the flange 81 fixed to the other of the front and rear surfaces of the 2 × 4 reinforcing beam 24 and with the web 79 and the other flange 83 spaced from the 2 × 4 reinforcing beam 24 to provide a guideway which snugly receives the associated vertically slideable reinforcing post. Preferably, the guides 71 extend vertically for a substantial distance to maintain the posts 77 and 79 in engagement with the wagon side walls 19 and 21 for a substantial distance.

The guides can take forms other than that shown in FIG. 3. In this regard, another construction contemplated by the invention is shown in FIG. 4 and comprises a guide 271 in the form of a bracket having a plate 273 which is adapted to be attached by screws (not shown) extending through apertures 275 and into the outer surface of a 2 × 4 beam 24.

Extending from the plate 273 are serially bent portions 277, 279, and an end portion 281 which enclose a tubular post 269 while permitting relative movement therebetween. As the end portion 281 does not extend all the way to the back side of the plate 273, upper and lower extension members 283 and 285 respectively are welded between the end portion 281 and the plate 273 to bridge the distance between the end portion 281 and the plate 273 so as to complete a box-like guiding enclosure for the tubular post 269. The lower extension 285 can also include a leaf portion 287 which extends freely from the lower extension and is not otherwise connected to the guide 271.

In order to prevent lateral displacement of the upper ends of the forward and rearward reinforcing posts 67 and 69, and thereby to prevent lateral bulging of the box under loading, the forward and rearward reinforcing posts 67 and 69 extend above the roof 41 and their upper ends are fixed to respective forward and rearward tie rods 87 and 89 which are subject to tension loading when the wagon is full. It should be noted that the tie rods 87 and 89 are independent of the roof 41 and are not connected thereto. The tubular posts 269 are similarly connected.

In order to afford raising of the roof 41 in response to vertical upward movement of the reinforcing posts 67 and 69, one or more of the posts on each side has fixed thereto, below the upper end thereof, a horizontally extending surface or bracket 91 which extends in the fore and aft direction and which engageably supports one of the outwardly extending ends 63 of one of the transverse roof members 61. If desired, shoulders extending from the roof could be employed for engagement with the horizontal post surface or brackets 91.

Accordingly, as the posts 67 and 69 are moved vertically upwardly, thereby incidentally raising the tie bars 87 and 89, the engagement of the brackets 91 with the ends 63 of the transverse members 61 will tilt the roof 41 about its horizontal axis or hinge. It will be noted that the supporting engagement of the transverse roof members 61 by the brackets 91 permits relative movement therebetween in the fore and aft direction to accommodate pivoting of the roof 41 about its horizontal axis.

Means are provided for raising the reinforcing posts 67 and 69 to raise the roof 41 and to permit lowering of the posts 67 and 69 to lower the roof 41. While various other arrangements can be employed, in the disclosed construction, such means comprises a winch 93 and a cooperating pulley system 95 for simultaneously raising and lowering the posts 67 and 69 on each side of the wagon 11 and for simultaneously affording differential vertical movement between the posts 67 and 69 on each side of the wagon. The winch has two coaxial reels 99 and 101 which are simultaneously operated by a common crank or handle 103 and which are connected to the pulley system 95.

More particularly, the pulley system 95 includes, on each side of the wagon, respective pulleys 111 rotatably mounted at the lower end of each of the forward posts 67. In addition, respective pulleys 113 are mounted on the side walls 19 and 21 rearwardly of the forward posts 67 and at a distance above the pulleys 111, when the roof 41 is in its lowered position, greater than the maximum vertical travel of the post 67 required to effect full raising of the roof 41. Pulleys 115 are also respectively mounted on each side of the wagon, on the forward side of the rearward post 69 at a distance above the lower end of the rearward post to accommodate full vertical movement of the rearward post. At their lower ends, the rearward posts carry pulleys 117.

On each side of the wagon, respective pulley ropes 119 and 121 are respectively anchored to the frame at 123 and 127 forwardly of the associated forward reinforcing posts or members 67 at approximately the level of the pulley 113. The pulley rope 119 extends, as shown, down to and about the pulley 111 on the lower end of the forward post 67, up to and about the pulley 113 located adjacent the forward post 67, across to and about the pulley 115 located adjacent the rearward post 69, down to and about the pulley 117 at the lower end of the rearward post 69, and then up to the reel 99 of the winch 93 which is mounted on the wagon frame 13 adjacent to the rearward post 69 and at a level approximating that of the level of the pulley 115.

The arrangement of the pulley rope 121 for the wagon side 21 is the same as that described, except that another pulley 129 is located in place of the reel 93 on the other side of the wagon. In addition, two other pulleys 131 and 133 are supported below the floor of the wagon, one on each side, and the pulley rope 121 is extended from the pulley 117 at the bottom of the rearward strap 69 upwardly to and around the pulley 129 and then downwardly to and about the pulley 131, and then underneath the floor of the wagon 11 to and about the pulley 133, and then upwardly to the second reel 101 of the winch 93. Thus, rotation of the reels 99 and 101 of the winch 93 causes simultaneous movement of the reinforcing posts 67 and 69 on both sides 19 and 21 of the wagon 11. In addition, use of the pulley system 95 affords differential vertical movement between the posts 67 and 69 with the forward posts 67 moving through a greater vertical travel than the rearward posts 69 while simultaneously applying to all of the posts 67 and 69 a vertical force capable of raising the roof 41 by tilting the roof 41 about its horizontal axis.

The winch 93 also includes suitable means, such as conventional releasable brake and pawl devices to selectively permit controlled opposite rotation of the reels 99 and 101 to raise the roof 41 and to control roof lowering under the influence of gravity. As the details of the winch construction are conventional and are not a part of the invention, the winch 93 will not be further described.

As shown in FIG. 4, the invention also contemplates mounting of the previously numbered pulleys 211 at the bottom of the tubular posts 269 for rotation in a U-shaped strap 291 welded or otherwise secured to the lower end of the tubular posts 269. Also as shown in FIG. 4, the previously numbered pulleys 115 can be arranged to be rotatably mounted by a U-shaped strap 292 suitably fixed to the guide or member 271. In addition, as shown in FIG. 4, a winch 293 with a single reel 299 can be supported from the guide 271 by a suitable bracket 301 and the pulley system can employ a single pulley rope 303 which, at its opposite ends, can be connected to guides 271 at the forward tubular posts and trained around the pulley system already described. The mid-bite of the rope can be suitably connected to the single reel 299 so that rotation of the reel 299 will simultaneously wind up and unwind the portions of the single rope 303 extending from the mid-bite to simultaneously displace the posts on opposite sides of the box.

In order to releasably hold the roof 41 in raised or elevated position or in one of the several positions intermediate the fully raised or elevated position and the lowered position, and to thereby relieve loading on the pulley system 95 and winch 93, the forward post 67 on each of the wagon sides 19 and 21 is provided with a series of vertically spaced holes 139 and the associated guide or channel 71 is provided with a boss 141 and an aperture 143 which extends through both the channel 71 and the boss 141 and which is located for selective registration with the holes 139 in the post 67. Extending axially through a portion of the boss 141 is an axially and radially extending key hole groove or slot 147 communicating with the aperture 143. At its outer end, the slot 147 communicates with a radially and circumferentially extending groove or recess 149 in the boss 141.

In order to releasably secure the reinforcing post 67 to the channel or guide 71, a rotatable and axially movable key or lock member 151 is employed, which key 151 includes a stem or shaft 153 extending through the aperture 143 in the boss 141 and channel 71 and having an inner end 157 adapted to be selectively received in any one of the vertically spaced holes 139 in the reinforcing post 67. At its outer end, the key 151 includes a transverse member or handle 159 and, intermediate its ends, the key 151 includes a radially extending arm 161 which is located in the axially and radially extending slot 147 when the key is displaced inwardly to insert the inner end 157 in one of the holes 139 to thereby lock the post 67 to the guide 71. However, when it is desired to unlock the post 67 from the guide 71, the key 151 is withdrawn and then rotated to locate the arm 161 in the radial and circumferentially extending groove 149 in the boss 141, thereby holding the key 151 in withdrawn position.

Means are provided for biasing the key 151 to the position locking the strap 67 to the guide or channel 71. While various arrangements can be employed, in the disclosed construction, such means includes a spring 163 which encircles the shaft 153 and which, at one end, is seated against the boss 141 and, at its other end, against the handle 159 of the key 151.

FIG. 4 also shows another form of means for releasably holding the posts in a desired relation to the guides. The means shown in FIG. 4 comprises a cam lock 315 which includes a stem 317 rotatably supported at both ends and including an intermediate offset portion 319 adapted to be engaged against the leaf part 287 which may be included on the lower guide extension 285 in response to rotation of the cam lock 315. Such engagement causes releasable frictional engagement of the leaf part 287 against the associated tubular post to thereby prevent relative movement between the tubular post and the guide.

In operation, when it is desired to raise the roof 41, the keys or lock members 151 on the forward guides or channels 71 are withdrawn and rotated to the position retaining the keys in unlocked relation to the posts 67. The winch 93 is then operated to wind the pull ropes 119 and 121 on the reels 99 and 101 and to thereby elevate the posts 67 and 69. Engagement of the brackets 91 with the ends 63 of the transverse roof members 61 will pivot and raise the roof 41 about its horizontal hinge. When the desired position of the roof is achieved, the keys 151 can then be rotated to the position affording insertion of the inner shaft ends 157 into the appropriate holes 139 in the posts 67. After such insertion, a desired amount of slack can be provided in the pulley system 95. When it is desired to relocate the roof 41, the slack can be taken from the pulley system 95 by operation of the winch 93 and the keys 151 can then be withdrawn to their release position. Consequently, the winch 93 can be operated to either raise the roof 41 or to permit controlled lowering of the roof 41 by gravity.

In the operation of the FIG. 4 components, the winch 293 is operated to wind up both portions of the single rope 303 to thereby elevate the tubular posts relative to its guides when the cam locks are unlocked. When the roof is in the desired position, cam locks can be returned to their lock positions to prevent further relative movement between the posts and the guides and thereby also retain the roof in desired location.

Shown in FIGS. 5 through 7 of the drawings is another modification or embodiment of a forage wagon 511 embodying various of the features of the invention. As in the embodiment shown in FIG. 1, the forage wagon 511 includes a box-like structure which is similar to the construction illustrated in FIG. 1 and to which a roof 541 is hinged. In the embodiment shown in FIGS. 5 through 7, the roof 541 has one or more transverse members 561 (see FIG. 7) which include, at each end, laterally outwardly extending end parts 53 at the sides of the roof 541. In addition, the roof 541 is provided with side panels 545 which, on the insides thereof, are provided with one or more reinforcing members 550. The members 550 can be arranged in any suitable fashion.

In accordance with the invention, a mechanical roof positioning means incorporating means affording a mechanical advantage to the operator are provided. Preferably such roof positioning means comprises a mechanical or hydraulic linkage for raising or pivoting the roof 541 and, if desired, for holding the roof 541 in selected position. Preferably, the roof positioning linkage is extensible. In addition, means are provided for connecting the transverse roof members 561 to the upper and forward margins of the box-like structure to prevent spreading or bulging of such margins.

While other mechanical or hydraulic means could be employed, in the illustrated construction, the roof positioning means comprises an extensible jack screw 552 which is pivotally connected, at its upper end, to the reinforced part of the roof side panel 545 and, at its lower end, is pivotally connected to the frame by a swivel connection 556 on a cross brace 554 on the box-like structure of the forage wagon 511. The jack screw 552 includes a crank 558 which is rotatable about a horizontal axis to cause extension and contraction of the jack screw 552 depending upon the direction of rotation of the crank 558 and thereby to pivot the roof 541 between raised, lowered, or any intermediate position. As the jack screw 552 and swivel connection 556 are of conventional construction, they will not be further described, except to note that the jack screw includes a gearing connection 559 affording mechanical advantage.

Enclosing the jack screw is a downwardly open dirt and rain shield 560.

A similar arrangement including a jack screw 562 is provided on the opposite side of the wagon 511 and is similarly connected between the roof 541 and the box-like structure. In order to coordinate operation of both jack screws 552 and 562, the crank 558 includes a horizontal extension 564 which is operably connected to the jack screw 562 so as to cause simultaneous operation of the opposing jack screws 552 and 562 in unison with each other in response to rotation of the single crank 558.

If desired, the jack screws 552 and 562 can also be employed to hold the roof 541 in selected position. However, in the construction shown in FIG. 5, means are provided for holding or releasably retaining the roof in selected position so as to relieve loading on the jack screws 552 and 562, and for simultaneously bracing the upper margins of the side walls of the box-like structure against bulging or spreading. Such means comprises, on each side of the wagon, one or more vertical brace members 570 which are preferably fabricated of angle iron to afford nesting in the bite of the angle iron with an associated upright reinforcing member or beam 524 or other suitable part of the box-like structure. Extending from each of the associated vertical reinforcing beams 524 are two or more spaced and threaded studs 572 which are receivable in a series of apertures in the associated brace members 570 to permit releasable fixation of the brace members 570 to the upright reinforcing beams 524 by nuts 573 received on the studs 572.

At their upper ends, the bracing members 570 are connected to the laterally extending part 563 of the transverse roof member or members 561 by means affording freedom of movement in the direction perpendicular to the pivotal axis of the roof 541, while, at the same time, supporting the roof 541 in selected position, and so as to afford a tension connection with the transverse roof member 541, which connection substantially avoids transmission of bending loads and which is operative to prevent spreading of the upper margins of the sides of the box-like structure.

While other specific constructions could be employed, in the illustrated construction, each laterally extending end part 563 of the transverse roof members 561 includes (See FIG. 6) a slot 580 which extends in the direction perpendicularly to the roof pivotal axis and in which there is received a bar or extension 582 which preferably has a rectangular or square cross section and which is welded or otherwise attached to the top of the associated one of the brace members 570 along one of the outer surfaces thereof. Extending through the bar 582 and above the laterally extending part 563 of the transverse roof member 561 is a pin 584 which limits upward movement of the extending part 563 relative to the bar 582. On its under surface, the laterally extending part 563 rests on the top edge of the brace member 570.

Thus, the brace members 570 and the transverse roof member or members 561 of the roof 541 have common vertical movement while affording relative movement therebetween in the direction perpendicular to the roof pivot axis. In addition, the bearing between the laterally outside surface 586 of the bars 582 and the laterally outer edges 588 of the slots 580 places the transverse roof members 561 substantially solely in tension without any noticeable bending load and, at the same time, the fit between the bars 582 and the slots 580 preferably affords sufficient pivotal movement of the brace members 570 about generally horizontal axes perpendicular to the roof pivot axis so as to permit relative brace member movement outwardly relative to the associated vertical reinforcing beams 554 so as to enable detachment of the brace members 570 from the studs 572 and thereby permit re-positioning of the roof 541 by operation of the jack screws 552 and 562.

Upon completion of the positioning of the roof 541, the brace members 570 are again swung inwardly into nested relation with the associated upright reinforcing beams 524, with the studs 572 extending through the desired apertures. The nuts 573 are then applied to the extending ends of the studs 572 so as to releasably but tightly fix the brace members 570 to the upright reinforcing beams 524.

Preferably, the slots 580 in the laterally extending parts 563 of the transverse roof members 561 are located so that, when the roof 541 is in a raised position, the bars 582 are located in transversely aligned relation to the transverse roof members 561, so as thereby to avoid transmitting any substantial bending load to the transverse members 561 and so as to substantially retain the transverse member 561 solely under tension load. It is also noted, that in the preferred construction, the brace members 570 overlie the upright reinforcing beams 524 for a substantial length so as to assist in minimizing bulging or spacing, or spreading of the upper margins of the side walls. As already indicated, one or more brace members 570 can be employed on each side. Preferably, at least two such brace members 570 are employed on each side.

In operation, the brace members 570 are disconnected from the vertical reinforcing beams 524 of the box-like structure by being pivoted outwardly and off the studs 572 after removal of the nuts 573. The jack screws 552 and 562 are then operated by rotating the crank 558 to raise or lower the roof 541, as appropriate, about its pivot axis. When the desired roof position is achieved, the brace members 570 are again placed against the upright reinforcing beams 524 with the studs 572 extending through the appropriate apertures. The nuts 573 are then applied to the studs 572 to fix the roof 541 in position, and so as thereby to unload the screw jacks 552 and 562 and to resist bulging of the upper and forward margins of the forage wagons side walls.

Shown 1FIG. 8 FIG. 8 of the drawings is an alternate arrangement for bracing the forward and upper margins of the forage wagon side walls against laterally outward bulging. (In FIG. 8 only one side wall 619 is shown.) More specifically, the arrangement in FIG. 8 includes attachment to the sides of the forage wagon of an appropriate number of tubular structures or guide members 671 which reinforce the sides of the box-like structure and which are similar to the guides 271 shown in FIG. 4. More specifically, in the construction disclosed in FIG. 8, the guide members 671 are fixed to the side wall reinforcing beams 624. Telescopically and freely slideably received in the guide members 671 are brace members 670 which, at their upper ends, extend through slots (such as the slots 580 shown in FIG. 6) in laterally outwardly extending end parts 663 of one or more transverse roof members 661 and which include, above the end parts 663, stop means in the form of transverse pins 684 for preventing upward pivotal roof movement relative to the brace members.

When employing the construction shown in FIG. 8, the weight of the roof 641 is continuously supported by the roof positioning means which can comprise, for example, the screw jacks 552 and 562 which are connected as shown in FIG. 5. Under such circumstances, such screw jacks serve both to raise and lower or pivot the roof 641 and to retain the roof in selected position against pivotal movement. In operation, the jack screws are actuated to raise or lower the roof 641 as desired to any of an infinite number of positions. In addition, the jack screws serve to maintain or hold the roof 641 in selected position when not in use for re-positioning.

As in the other constructions already described, if desired, releasable means could be provided for selectively and releasably fixing the brace members 670 and guide members 671 shown in FIG. 8 in adjusted telescopic relation to each other so as thereby to hold the roof 641 in selected position and to thereby relieve the roof positioning means from loading, except during re-positioning. Various releasable means can be employed, such as for instance, the construction disclosed in FIGS. 2, 3, and 4. In operation, the releasable means is actuated to release the fixed connection between the brace members 670 and guide members 671. Thereafter, the jack screws or other roof re-positioning means can be operated to raise or lower the roof 641 as may be desired and, when the roof 641 is in the desired position, the releasable means can again be actuated to hold the roof 641 in the newly selected position.

It is to be particularly noted that the invention contemplates that the roof and the mechanism for displacing the roof about its hinge can be manufactured and sold independently of the box or other structure to which the roof and the roof operating mechanism is subsequently connected.

Various of the features of the invention are set forth in the following claims.

I claim:

1. The combination of a roof having means adapted for hinging said roof to a support for swinging movement relative to said support about an axis, transverse members extending from the sides of said roof, posts including respective surfaces adapted for supporting engagement with said transverse members, means for connecting said posts to the support and for guiding movement of said posts in a direction transversely of said axis, said surfaces and said transverse members cooperating so as to support said roof and so as, in response to movement of said posts transversely of said axis, to afford relative movement between said members and said surfaces in the direction perpendicular to said axis during tilting of said roof about said axis.

2. A box-like structure comprising a frame including spaced side walls and an end wall connected to said side walls to provide said box-like structure which is, at least partially, open at the end remote from said end wall, a roof comprising a top panel, means on said roof and on said walls connecting said roof to said walls for roof swinging movement about a horizontal axis, and linkage means connected to one of said side walls and to said roof for pivoting said roof about said connecting means between a plurality of positions including a raised position with said roof top panel at an inclined disposition so as to increase the open area at the end of said structure remote from said end wall, said linkage means including a rotatable member affording a mechanical advantage during operation of said linkage means.

3. A box-like structure in accordance with claim 2 and further including a transverse roof member with a laterally extending end part and a brace member on one side of said box-like structure, means connecting said brace member to said frame, and means connecting said brace member to said transverse member end part for relative movement therebetween in the direction perpendicular to said pivotal axis of said roof.

4. A box-like structure in accordance with claim 3 wherein said means connecting said brace member to said transverse roof member is arranged so that the brace member extends in substantial alignment with the transverse roof member when the roof is in the raised position.

5. A box-like structure in accordance with claim 2 wherein said roof pivoting means includes a jack screw having one end connected to said roof and another end connected to said frame.

6. A box-like structure in accordance with claim 5 wherein said first mentioned jack screw is connected on one side on said box-like structure and further including another jack screw connected to the other side of said box-like structure in like manner to the connection of said first mentioned jack screw, and means extending transversely of said box-like structure for simultaneously operating said jack screws in unison.

7. A box-like structure in accordance with claim 2 and further including means for strengthening the upper margins of said side walls against laterally outward bulging.

8. A box-like structure in accordance with claim 7 wherein said means for strengthening the upper margins of said side walls against laterally outward bulging comprises a transverse roof member with laterally oppositely extending end parts, and at least one brace member on each side of said box-like structure, means connecting said brace members to said frame, and means respectively connecting said brace members to said transverse member end parts for relative movement therebetween in the direction perpendicular to the pivotal axis of said roof.

9. A box-like structure in accordance with claim 8 wherein said means connecting said brace members to said transverse roof members is arranged so that said brace member extends in substantial alignment with said transverse roof member when said roof is in the raised position.

10. A box-like structure comprising a frame including spaced side walls and an end wall connected to said side walls to provide said box-like structure which is, at least partially, open at the end remote from said end wall, a roof comprising a top panel, means on said roof and on said walls connecting said roof to said walls for roof swinging movement about a horizontal axis between a plurality of positions including a raised position with said roof top panel at an inclined disposition so as to increase the open area at the end of said structure remote from said end wall, and means for strengthening the upper margins of said side walls against laterally outward bulging comprising a transverse roof member with laterally oppositely extending end parts, and at least one brace member on each side of said box-like structure, means connecting said brace members to said frame, and means respectively connecting said brace members to said transverse member end parts for relative movement therebetween in the direction perpendicular to the pivotal axis of said roof.

11. A box-like structure in accordance with claim 10 wherein said means connecting said brace members to said transverse roof members is arranged so that said brace member extends in substantial alignment with said transverse roof member when said roof is in the raised position.

* * * * *